Oct. 4, 1960 J. E. BARRY ET AL 2,954,824

CARD TO TAPE TRANSLATOR

Filed Sept. 3, 1957 5 Sheets-Sheet 1

INVENTORS
JAMES E. BARRY
MYRLE V. CROSS JR.

By George C. Sullivan
Agent

CARD TO TAPE TRANSLATOR

Filed Sept. 3, 1957 5 Sheets-Sheet 2

INVENTORS
JAMES E. BARRY
MYRLE V. CROSS JR.
By George C. Sullivan
Agent

INVENTORS
JAMES E. BARRY
MYRLE V. CROSS JR.
By George C. Sullivan
Agent

INVENTORS
JAMES E. BARRY
MYRLE V. CROSS JR.
BY George Sullivan
Agent

INVENTORS
JAMES E. BARRY
MYRLE V. CROSS JR.
By George C. Sullivan
Agent

United States Patent Office 2,954,824
Patented Oct. 4, 1960

2,954,824

CARD TO TAPE TRANSLATOR

James E. Barry, Northridge, and Myrle V. Cross, Jr., Reseda, Calif., assignors to Lockheed Aircraft Corporation, Burbank, Calif.

Filed Sept. 3, 1957, Ser. No. 681,714

13 Claims. (Cl. 164—111)

This invention relates generally to digital control systems and more particularly to a card to tape translator adapted to prepare punched tape from pre-punched cards for use in automatic machine control devices and the like.

The use of tape to operate numerically controlled machine tools is dictated by the large amount of computation necessary to control the making of a part which will meet normal manufacturing tolerances. In such applications where large amounts of information are needed, tape is a more suitable medium than cards since the tape may be stored in rolls and fed into the machine controller at the required rate with relative ease.

There are a number of machine tools such as milling machines and presses, as used in the aircraft and allied industries, which are being adapted to operate automatically from tape operated machine controls. There is no standard tape format for the machine control units of the various manufacturers and the extensive and continuing effort in the research and development of this equipment will no doubt dictate the need for new and different punched tape formats.

Users of the punched tape controlled automatic machine tools have a need for equipment to punch tape in the proper code for any particular part to be formed and in the proper format for any one of the several different automatic machines in use.

It is obviously desirable to have tape punching equipment capable of punching the proper code in any desired format so that it may be used with all automatic machine tools.

An object of this invention is to provide an adaptable card to tape translator for producing punched tape in any desired format using any one of a number of digital computers having a punched card output such as those now commonly used for accounting and data reduction purposes. The digital computer punches the program for machine control computations onto a plurality of cards which are subsequently fed into the translator for controlling a tape punch machine. The punched tape output in the desired format is then employed in a tape operated controller for automatically directing its numerically controlled production machine.

Another object of this invention is to provide a control unit for the translator which will automatically key the card feeding and reading operations to the tape punching operations through a multi-contact stepping switch to avoid improperly or prematurely punching the tape.

Another object of this invention is to provide a card to tape translator control unit which will automatically return the stepping switch to a predetermined start position upon activating the translator and immediately upon completion of a punch cycle without stopping to read unused rows of contacts on the stepping switch, thus permitting a versatile translator design which is efficient in operation.

Still another object of this invention is to provide translator control unit circuitry which is dependable in operation, requiring no critical adjustments to give accurate and reliable results.

Further and other objects will become apparent from a reading of the following description, especially when considered in combination with the accompanying drawing, wherein like numerals refer to like parts.

GENERAL DESCRIPTION

Almost every computing center in industry has a computing machine of one type or other, such as the International Business Machine's 650 computer which will produce a punched card output suitable for use with the translator. Also, almost every accounting office in industry has card handling equipment which may be readily adapted for use in the translator. Thus a high utilization of existing equipment permitting the introduction of automatic machine tools into industry at minimum cost may be realized in following the teachings of this invention.

Figure 1:
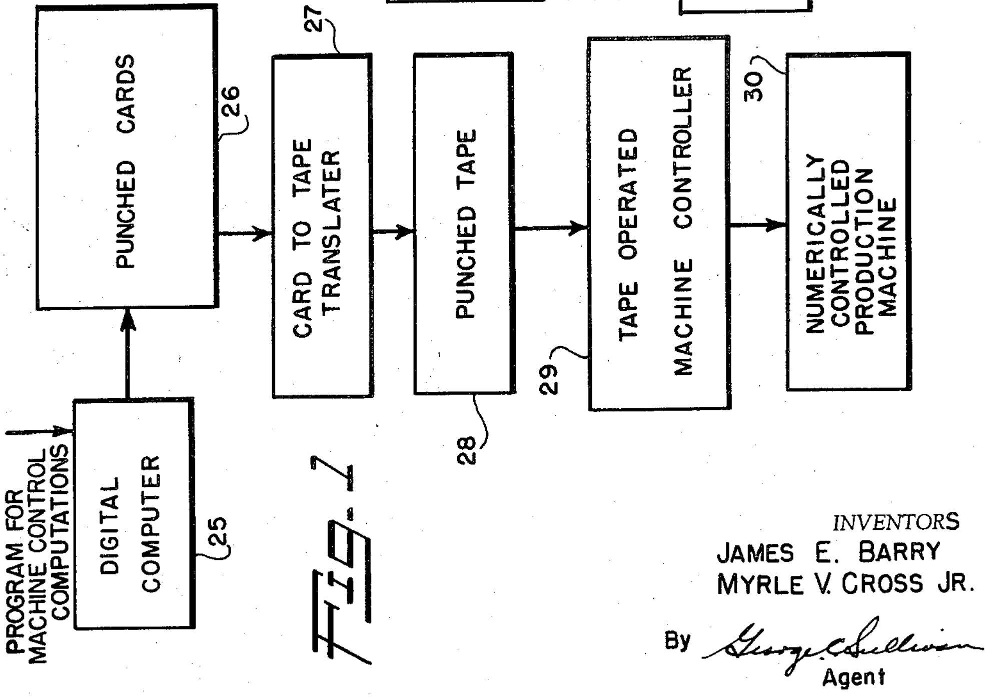
Figure 1 is a schematic flow diagram of a typical system using the card to tape translator.

As illustrated in the flow diagram of Figure 1, the program for machine control computations is fed into a digital computer 25 which records the program on punched cards 26. The punched cards are then fed into the card to tape translator 27. The translator output is a punched tape 28 having perforations therein representing the computations for the machine control program in the proper format for utilization in the tape operated machine controller 29. The output of the machine controller directs the operation of the numerically controlled production machine 30 such as a milling machine, punch press, or the like.

Figure 4A:
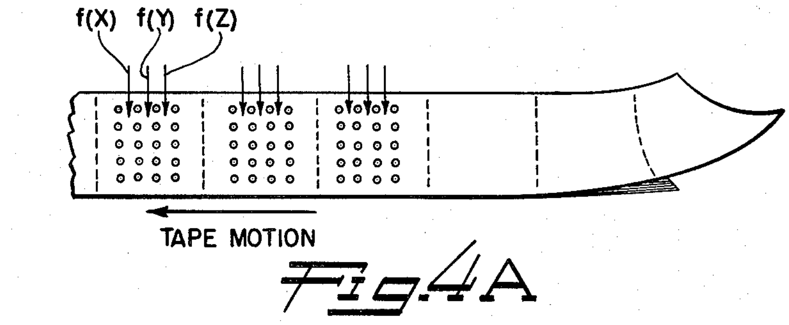
Figures 4A and 4B illustrate the difference between the standard punch tape format and a typical format for machine control punched tape.
Figure 4B:
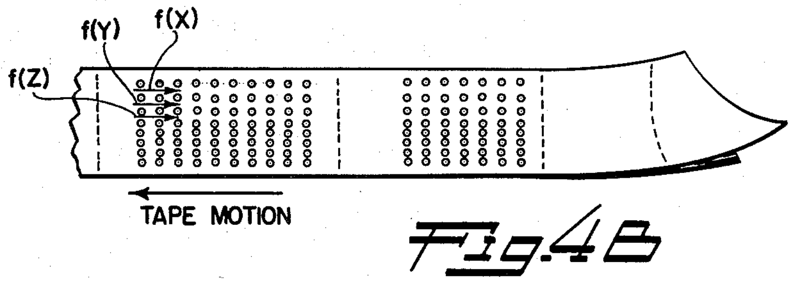

Because there is no standard tape format for all machine control units presently on the market or under development, it is a practical requirement for a translator designed for general use to be easily modified for producing any tape format. To illustrate the differences in the tape format, Figure 4A shows the format produced by standard card to tape converters while Figure 4B shows one type of machine control tape format required for an automatic milling machine. In general, the tape format for machine control applications involve variations of the Figure 4B arrangement wherein the control function $F(x)$, $F(y)$, $F(z)$, etc. are arranged longitudinally of the tape to provide the continuous input of information into the machine tool for each variable. The variations of this format normally involve the number of functions and the block length, requiring changes in the translator circuitry.

TRANSLATOR

Figure 2:
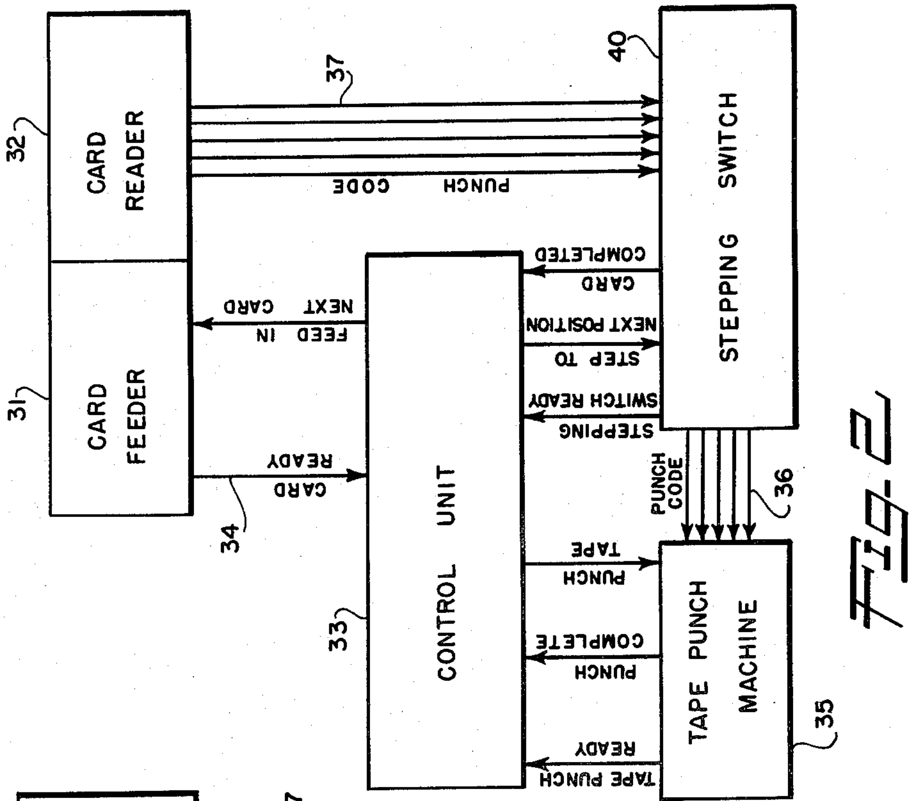
Figure 2 is a schematic block diagram of the card to tape translator.

The translator, as shown in block diagram form in Figure 2, includes a card feeder device 31 and a card reader device 32 which are normally physically packaged into one machine. An example of a suitable card feeder and reader is the International Business Machine's gang summary punch, Type 523. Inasmuch as the mechanical details of the card feeder and reader form no part of this invention, they are omitted from this disclosure. A knowledge of the construction details and operation of the card feeder and reader may be obtained from a study of Patent Re. 21,133 and the "Customer Engineering Reference Manual" (Form 22–6154–0) published in 1954 by the International Business Machine Corporation.

The card feeder 31, in addition to its normal function of supplying cards to be read, provides a card ready signal which is applied to translator control unit 33 through lead 34 when a card is fed into card reader 32 and positioned for being read. The punch code from card reader 32 is fed into a stepping switch 40 through a plurality of leads 37. The stepping switch sequentially scans the card reader output and applies the resulting punch code to the tape punch machine 35 through a plurality of leads 36. Timing control of the card feeder, the tape punch machine and stepping switch is generated in control unit 33 to insure proper operation of the tape punch machine to reproduce the punch code which appears on the cards being fed to card reader 32.

Figure 5:
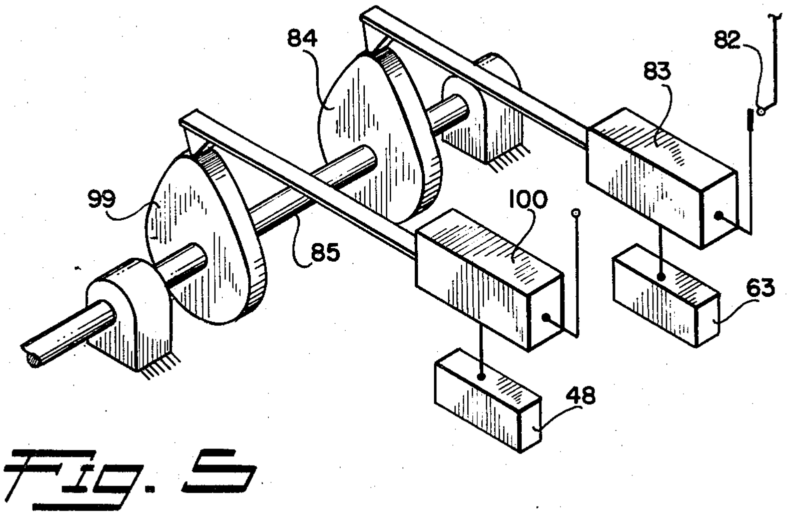
Figure 5 shows the cam arrangement in the tape punch machine which forms a part of the translator control system.

The tape punch machine may be of any conventional type, modified by adding timing cams, as shown in Figure 5. Only those parts of the tape punch machine which are incorporated into the control circuitry of the translator are described herein, however reference may be had to a publication SP-8590RZ entitled Motorized Tape Punch—model two, published by the Commercial Controls Corporation for a more complete description of this particular piece of equipment.

STEPPING SWITCH

Figures 6, 7:
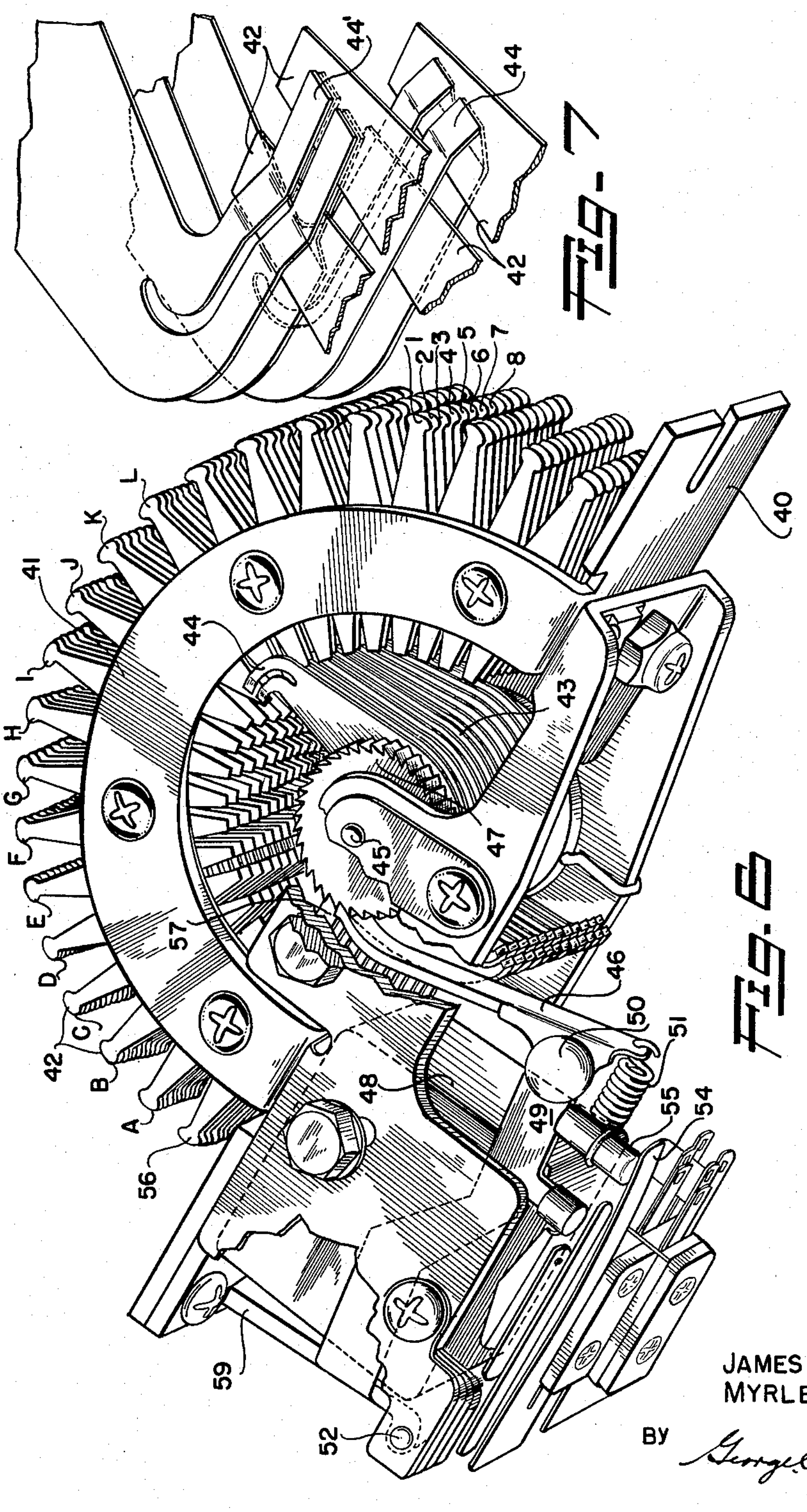
Figure 6 is a fragmentary perspective view of the stepping switch, forming a part of the translator.
Figure 7 is a fragmentary view showing a bridging type wiper spring employed in the stepping switch wiper arm assembly.

Referring to Figure 6, stepping switch 40 includes a frame 41 supporting a plurality of rows of fixed contacts 42, suitably insulated from each other. The number of contacts in each row of the stepping switch, as well as the number of rows, is determined largely by the variety of tape formats which the device is to be made capable of producing. For most all presently conceived applications of the translator any number of rows of contacts above 12, wherein each row contains 12 individual contacts, is entirely adequate. The stepping switch arrangement is quite variable in the design of the translator however and the specific arrangement of contacts shown and described is for purposes of illustration rather than limitation.

A wiper arm 43 having a plurality of wiper springs 44, one for each contact in a row of contacts is employed. If there are 12 contacts in a row there will be 12 wiper springs. Wiper arm 43 is fixed to a shaft 45 carried by frame 41 and is adapted to be moved from one row of contacts to the next adjacent row of contacts by a pawl 46 and ratchet 47 mechanism acuated by an electromagnet 48 which responds to current impulses. Pawl 46 is pivoted to a lever 49 through pin 50 and urged into engagement with ratchet 47 by means of spring 51. Lever 49 is swingably carried through pin 52 for limited movement relative to the electromagnet 48. A leaf spring 54 carried at one end by frame 41, engages a piston rod 55 projecting from lever 49 to urge the lever away from the electromagnet. When magnet 48 is energized the switch is cocked, that is, the free end 59 on lever 49 is pulled toward the magnet positioning pawl 46 into the next tooth on ratchet 47; and when it is de-energized the wiper assembly is driven forward by one step from one row of contacts to the next adjacent row of contacts by the energy stored in spring 54.

One wiper spring 44', on wiper arm 43, is of the bridging type, as illustrated in Figure 7, so that successive contacts on the same level remain closed while the switch is stepping, for purposes hereinafter explained. The bridging wiper spring, in bridging, only engages two contacts at a time. That is it leaves one of the bridged pair of contacts before making a new bridge. All other wiper springs on wiper arm 43 are of the non-bridging type, that is, they leave one row of contacts before touching the next row so that successive points are never interconnected.

The output of stepping switch 40 is obtained at the end row of contacts 56. Each of the contacts in this row electrically connect with the corresponding wiper spring 44 at the same level through a fixed lead 57. A group of these output contacts 56 are coupled to the tape punch machine, as shown in Figure 2, while two are reserved for use in the timing circuitry of control unit 33. The other rows of contacts in the stepping switch are used to feed the punch code as well as the various timing signals identified in Figure 2 as the stepping switch ready signal, the step to next position signal, and the card completed signal.

CONTROL UNIT

Figures 8, 9:
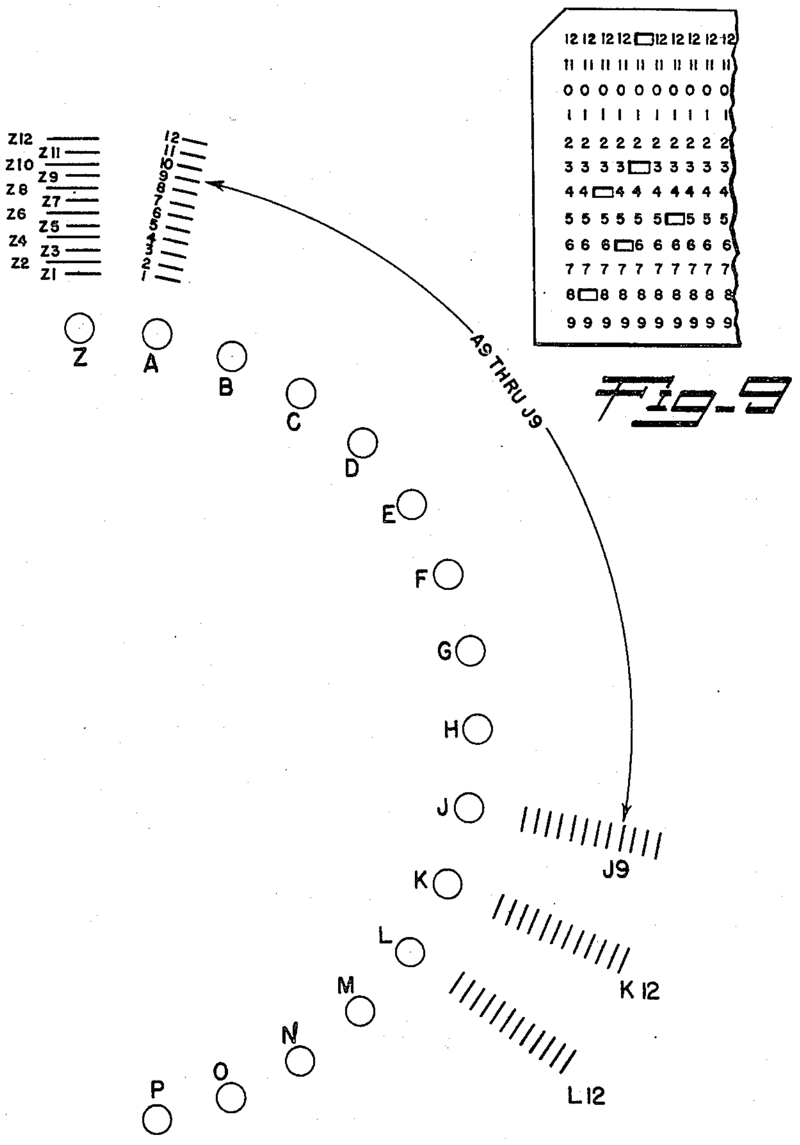
Figure 8 shows the stepping switch notation employed for the specific translator circuit disclosed herein.
Figure 9 is a fragmentary view of a record card.

An understanding of the control unit circuitry which operates in conjunction with the stepping switch can best be obtained by describing a typical wiring set-up for an 8-level punch format. For this purpose the stepping switch contacts are identified as shown in Figure 8. Referring to this figure, it is seen that the various rows of contacts are each assigned an alphabetical letter wherein the output row of contacts 56 is termed the "Z" row with the next succeeding rows starting with the row next adjacent to the "Z" row being assigned the letter "A" and continuing alphabetically, omitting the letter "I," until all the rows have been identified. The various levels of contacts in the rows may now be assigned according to their relative position by a combination letter and number scheme Z1, Z2, Z3, . . . , A1, A2, A3, . . . , B1, B2, B3, . . ., and so on through the various rows of contacts and through the various levels of contacts in each row. The alphabetical letter represents the particular row and the number represents the contact level. Since not all of the contacts on the stepping switch are needed in the particular example described herein, not all of the rows are identified.

The information to be translated into an 8-level punch code on the tape is stored on one row and preferably the fours row of the cards, one of which is shown in Figure 9. These are the standard type cards commonly used with record storage and handling equipment such as that manufactured by International Business Machine Corporation. There are 80 columns on the card but no punch is ever made in the 80th column, therefore, there are 79 usable columns in the one row on each card. To provide an 8-level punch code there may be stored 9 fields of 8 columns each on a card. These fields are stored successively without separation by unused columns, therefore columns 1 through 72 will be used. Each character on the card is a replica of the 8-level punch code to which it corresponds; that is, reading the character from left to right on the card will correspond to reading the punch levels on the tape transversely thereof and corresponding columns and levels will both be punched or both not be punched, as dictated by the functions involved.

As an example, suppose the tape is to be read by the machine controller by feeding the tape longitudinally through the machine in the direction indicated in Figure 4B and suppose further that 8 functions are to be read. Each function will be calculated in binary to $n$-places and each level on the tape corresponds to one function. In the binary value for each function a "1" corresponds to a punch in the tape and a "0" corresponds to no punch in the tape. The first punch will correspond to the first character on the first card according to the first set of digits of the functions. The second punch will correspond to the set of second digits of the functions and to the second character of the first card and so on.

It is obvious that merely making the functions associated with the extra levels zero, the translator will produce a seven-six-five or lesser level format. This procedure will waste some card space however and an alternative is available. The alternative is to change the card format for an *n*-level punch such that each field will contain *n* columns. For example, to produce a 6 level punch, a card format of 13 fields of 6 columns each may be employed using columns 1 through 78 on the card. Thus it is clear that the translator can be adapted easily and without added equipment to produce one bit up to 8 bit characters in any present day punch tape format, limited only by the number of contacts on the stepping switch. At the present state of the art no more than 8 bit characters are needed and, therefore, a stepping switch as described herein is entirely adequate to make the translator adaptable to all useful tape formats.

To produce an 8-level punch code where each level represents a different variable on the tape such as $F(x)$, $F(y)$, $F(z)$, etc., as shown in Figure 4B, the following table is developed showing the corresponding stepping switch contact point for each column output of the card reader.

*Table 1*

| Card Reader Number | Stepping Switch Contact Point | Card Reader Number | Stepping Switch Contact Point | Card Reader Number | Stepping Switch Contact Point |
|---|---|---|---|---|---|
| 1 | A1 | 25 | D1 | 49 | G1 |
| 2 | A2 | 26 | D2 | 50 | G2 |
| 3 | A3 | 27 | D3 | 51 | G3 |
| 4 | A4 | 28 | D4 | 52 | G4 |
| 5 | A5 | 29 | D5 | 53 | G5 |
| 6 | A6 | 30 | D6 | 54 | G6 |
| 7 | A7 | 31 | D7 | 55 | G7 |
| 8 | A8 | 32 | D8 | 56 | G8 |
| 9 | B1 | 33 | E1 | 57 | H1 |
| 10 | B2 | 34 | E2 | 58 | H2 |
| 11 | B3 | 35 | E3 | 59 | H3 |
| 12 | B4 | 36 | E4 | 60 | H4 |
| 13 | B5 | 37 | E5 | 61 | H5 |
| 14 | B6 | 38 | E6 | 62 | H6 |
| 15 | B7 | 39 | E7 | 63 | H7 |
| 16 | B8 | 40 | E8 | 64 | H8 |
| 17 | C1 | 41 | F1 | 65 | J1 |
| 18 | C2 | 42 | F2 | 66 | J2 |
| 19 | C3 | 43 | F3 | 67 | J3 |
| 20 | C4 | 44 | F4 | 68 | J4 |
| 21 | C5 | 45 | F5 | 69 | J5 |
| 22 | C6 | 46 | F6 | 70 | J6 |
| 23 | C7 | 47 | F7 | 71 | J7 |
| 24 | C8 | 48 | F8 | 72 | J8 |

It should be noted from the above table that stepping switch contacts in levels 1 through 8 and rows A through J are used to transmit the punch code from the card reader to the tape punch machine. The 9th level of stepping switch fixed contacts A through J which cooperate with the bridging type wiper spring on wiper arm 43 are connected to ground while several other of the fixed contacts are coupled to components in the control unit circuitry as shown below in Table 2.

*Table 2*

| Source | Stepping Switch Contact Number |
|---|---|
| Switch 74 | K10 |
| Negative Terminal | A9 |
| Do | B9 |
| Do | C9 |
| Do | D9 |
| Do | E9 |
| Do | F9 |
| Do | G9 |
| Do | H9 |
| Do | J9 |
| Relay 61 | L12 |
| Relay 101 | K12 |

Figure 3:
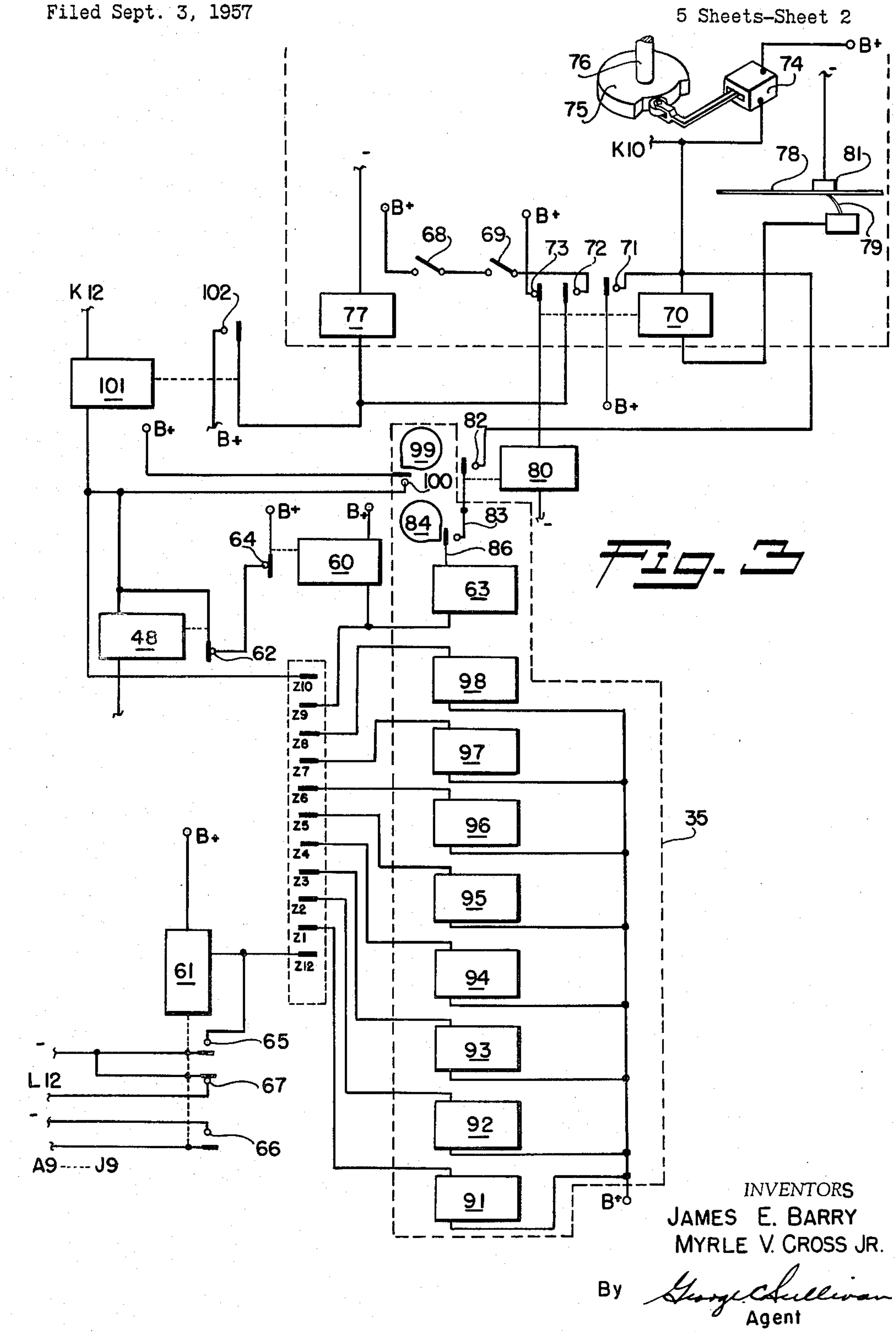
Figure 3 is a detail schematic block diagram of the translator control circuitry.

Referring now to Figure 3 and the translator's control unit circuitry, when power is initially supplied it is required that the translator "pre-home"; that is, return to a predetermined start position without prematurely punching the tape. This pre-homing mode is obtained through the use of relays 60 and 61 in the control unit. Relay 60 is coupled to a source of electrical potential identified as B+ and with the Z9 contact on the stepping switch for actuation upon Z9 being coupled to ground completing a circuit through the relay. Contact 64 of relay 60 is normally closed. Thus when the relay is de-energized, stepping switch electromagnet 48 is coupled to B+ through its own normally closed relay contact 62. This contact is held open only when the stepping switch magnet is energized. Since contacts 64 and 62 are normally closed the stepping magnet will home stepping switch 40 if stepping switch contacts A9 through J9 are not grounded. However, if stepping switch contacts A9 through J9 are grounded, J9, which is the bridging contact in the stepping switch, will complete a circuit through relay 60 to open relay contact 61 and prevent the homing mode from being accomplished. Likewise, if Z9 is coupled to ground the punch magnet 63 on the tape punch machine will be activated, causing the tape to be prematurely punched and moved to the next punch position. Therefore, the relay circuitry associated with relay 61 is employed to keep A9 through J9 open until wiper arm 43 on stepping switch 40 reaches the "L" row of stepping switch contacts. As shown in Figure 3, relay 61 is provided with a pair of normally open contacts 65 and 66 and a normally closed contact 67. Initially, switch contact L12 is grounded because relay contact 67 is closed. Therefore, Z12 will be grounded when wiper arm 43 reaches the "L" row of stepping switch contacts and hence relay 61 will then be energized. When relay 61 is energized, contacts 65 and 66 are closed and contact 67 is opened. Relay 61 will stay energized as long as the B+ voltage is applied since the relay is grounded through contact 65. Thus contact 66 will stay closed grounding stepping switch contacts A9 through J9, setting up the translator for operation when wiper arm 43 returns to the predetermined start position at the "A" row of stepping switch contacts.

When the power from B+ is supplied and the punched cards are stacked in card feeder 31 the translator will operate by closing start button switch 68. Stack lever switch 69 employed in series with starting switch 68 is held closed by the stack of cards in card feeder 31. When the cards are exhausted, stack lever switch 69 opens to automatically stop cycling the card feeder.

A card detection and card ready signal is generated in the translator to initiate each card reading cycle. For this purpose a card detector relay 70 is provided having a pair of normally open contacts 71 and 72 and a normally closed contact 73. Card detector relay 70 is energized by either of two circuits; the first circuit being through relay switch 71 and the second circuit includes a cam acutated switch 74 which is operated from a cam 75 on the drive shaft 76 of the card feeder device. The cam closes switch 74 to complete a circuit from B+ to the card detector relay 70 when a card is fed into the card reader and positioned in the fours row read position. Relay 70 is grounded through a circuit in the card reader which is held open only so long as a card 78 is under the read brushes 79.

Assume for purposes of this description that start button switch 68 is closed and stack lever switch 69 is also closed. Then if card detector relay 70 is energized, contact 72 will close and energize clutch magnet 77. When clutch magnet 77 is energized the next card is fed into the read position of the card reader device. At the start or read position of the card reader, cam 75 holds switch 74 closed and since there is as yet no card in the reader, a circuit is completed to ground through read brush 79, energizing card detector relay 70 which closes contact 72 and energizes clutch magnet 77 to cause the first card to be fed into the read position. Shortly after the card feeder vacates the start position, its cam 75 opens switch 74 and holds it open until the cycle has been completed wherein the card feeder is again at the start position. This would normally allow relay 70 to de-energize before the card is placed in the reader and give a false card ready signal. To prevent this, contact 71 is employed to couple realy 70 to B+ once the realy is initially energized and hold it energized until the ground connection is opened by inserting a card 78 between read brush 79 and its contact 81. Thus interlock relay 80, which produces the card ready signal is energized to close its normally open contact 82 only when a card is positioned in the card reader.

Normally open contact 82 of interlock relay 80 couples switch 83 to B+ through switch 71. Switch 83 is carried on the tape punch machine 35 and is actuated by a cam 84 carried on the tape punch drive shaft 85, as most clearly shown in Figure 5. Lead 86 from switch 83 connects with the punch control magnet 63. When the punch control magnet is activated, the drive shaft goes through one revolution causing the tape to be punched and moved to the next punch position.

When the card ready signal is obtained by energizing interlock relay 80, cam actuated switch 74 is closed and the ground connection for card detector relay 70 is opened by a card 78 in the card reader. At this time a card is being read. Therefore, each contact from A1 through J8 on stepping switch 40 is activated or not, depending on the characters in the several fields on the cards and in accordance with Table I set forth hereinabove.

In the start position the "A" row of stepping switch contacts are being read with Z9 grounded through fixed contacts A9 through J9. Cam 84 at the start position of the tape punch machine or shortly thereafter pushes switch 83 closed, allowing the B+ voltage from cam operated switch 74 to be applied to control magnet 63 on the tape punch machine. Since the Z9 contact on stepping switch 40 is used to couple the punch control magnet 63 to ground through contacts A9 through J9, the punch magnet is energized, initiating a tape punching cycle and moving the tape to the next punch position. Punch magnets 91 through 98 are coupled to stepping switch contacts Z1 through Z8 respectively, actuating the punch magnets and perforating the tape in accordance with the punch code appearing on the punched cards being fed to card reader 32.

In order to step to the next row of contacts on stepping switch 40, stepping magnet 48 must be energized. When Z9 is grounded through one of the contacts A9 through J9, relay 60 is energized holding relay contact 64 open. The signal to step to the next row of contacts and read the next character on the same card in the card reader is derived from a second cam 99 in the tape punch machine as shown in Figures 3 and 5. Switch 100 carried by the tape punch machine is closed by cam 99 after punch magnets 91 through 98 have been energzed. Using a Commercial Controls tape punch machine, closing of switch 100 by cam 99 should occur at approximately 120° of shaft rotation as measured from the start position. As soon as the stepping magnet has been energized switch 100 may be opened. With a commercial controls tape punch machine this switch should be held closed for approximately 25° of shaft rotation. The stepping action of stepping switch 40 occurs upon de-energizing the stepping magnet, hence closing of switch 100 by cam 99 provides the punch complete signal indicated in Figure 2 and opening of switch 100 provides the step to next position signal also indicated in Figure 2.

As the tape punch machine returns to the start position, the wiper arm on stepping switch 40 moves to the next adjacent row of stepping switch contacts. At the start position, cam 84 on the drive shaft of the tape punch machine closes switch 83 and reads the next character on the same card and effects tape perforations in accordance with the punch code appearing on the card. The stepping switch and tape punch machine continue to cycle in the manner described above until stepping switch wiper arm 43 reaches the "K" row of contacts at which time Z9 is opened, de-energizing relay 60 to complete a circuit through contact 64 energizing stepping magnet 48. At the same time, Z10 is coupled to B+ through switch 74 and contact K10 completes the circuit to relay 101. Relay 101 is grounded through K12 and Z12 causing the same to become energized, closing relay contact 102 and completing a circuit energizing clutch magnet 77 in the card feeder device 31.

The card completed signal is derived by Z10 being coupled to B+ through K10 and switch 74, and by K12 being grounded through Z12 and contact 65. Z10 is coupled to B+ only when switch 74 is closed. K12 is grounded only when relay contact 65 is closed. Thus the card completed signal which energizes clutch magnet 77 in the card feeder is obtained only when the card feeder and reader are in the predetermined start position and the translator has completed reading at least one card without interruption in the supply of power from the B+ voltage source. Actuation of clutch magnet 77 initiates the action causing the card feeder to move another card into the card reader.

The current through Z10 is also used to energize stepping magnet 48. Current stops flowing through Z10 when switch 74 is opened by cam 75. When Z10 is uncoupled from B+, stepping magnet 48 is de-energized causing the stepping switch wiper arm to move to the next row of contacts. Since Z9 is open from the "K" row of contacts to the "A" row of contacts, relay 60 remains de-energized to produce the homing mode. During this mode no punches will be made in the tape since Z9 is open and the punch control magnet 63 therefore has no ground.

In the homing mode, with relay 60 de-energized the stepping switch magnet is coupled to B+. This causes it to become energized long enough to open contact 62. When contact 62 opens, the stepping magnet de-energizes causing wiper arm 43 to move to the next row of contacts. As the stepping magnet is momentarily de-energized the circuit to B+ is again completed, causing the stepping magnet to once more become energized opening its contact 62. This action will continue causing wiper arm 43 to continue to step without interruption to the next succeeding row of contacts until the "A" row of contacts is reached. At such time Z9 is again coupled to ground through contact A9. With Z9 grounded a circuit is completed energizing relay 60, thus ending the homing mode.

During the homing mode of the stepping switch a new card is fed into card reader 32 as the tape punch machine returns to the start position. Upon completion of the homing mode, the new card is read in the same manner as described above. A plurality of cards may thus be read automatically one at a time. With an 8-bit character the translator should punch approximately 9 characters a second and with a 6-bit character it should produce about 13 characters a second. These speeds are entirely satisfactory for a translator with the versatility to produce any desired tape format, especially in applications where the tape may be prepared prior to use, such as in the machine tool art.

Operation of the translator is initiated by placing a stack of cards in the card feeder to close stack lever 69 and by manually closing start button 68. All other operations of the translator are automatic and as previously described. The cards are fed one at a time into the card reader and the punch code is applied to the tape punch machine through the stepping switch to reproduce the punch code by means of making perforations in the tape. The control circuitry obviates the possibility of making premature punches and controls the stepping switch to scan the entire punch code on each card before directing a new card into the machine. The homing provision in the control unit returns the stepping switch to its predetermined start position without stopping to read unused rows of contacts on the switch, thus providing substantial time savings in performing the functions. Even though the switch is provided with a number of extra contacts to make the translator suitable for generalized use, its speed of operation is substantially unaffected. The translator may be used with different card formats by simply rearranging the wiring connections between the card reader and the rows of fixed contacts on the stepping switch. Thus in a matter of minutes the translator may be adapted to any format.

A specific embodiment of the translator has been shown and described merely for purposes of illustration and accordingly it should be understood that certain alterations, modifications and substitutions may be made to the instant disclosure without departing from the spirit and scope of the invention, as defined by the appended claims.

We claim:

1. A punched card to punched tape translator comprising card reading means, tape punching means adapted to reproduce an applied punch code, switch means connecting said card reading means and said tape punching means and completing circuits transmitting information from said card reading means to the tape punch machine in a plurality of cycles of the switch means, and circuit means keying operation of the switch means to the tape punching means during a portion of each cycle and uncoupling the keying means during the remainder of each cycle to return the switch means for automatic recycling.

2. In a card to tape translator including a card reader and tape punching means, switch means connecting the card reader with the tape punching means for transmitting information from the card reader to the tape punching means by cyclic operation of the switch means, and circuit means connecting with said switch means and effecting cyclic operation thereof, said circuit means keying operation of said card reader with the tape punching means only during a portion of each cycle.

3. A punched card to punched tape translator comprising, a reading head, a plurality of individual circuits connecting with said reading head and detecting punches in a card placed on the reading head, tape punching means, a switch having a plurality of rows of fixed contacts, said plurality of individual circuits each connecting with a fixed contact on said switch, a wiper arm on said switch, said wiper arm having a plurality of movable contacts arranged to engage one row of fixed contacts at a time, means operatively engaging said wiper arm and moving the wiper arm from one row of fixed contacts to the next adjacent row of fixed contacts, circuit means electrically coupling one group of the movable contacts with said tape punch means to produce punches in the tape corresponding to the punches in the card, and feedback means through said switch keying the card reading and tape punching operations.

4. In a device as set forth in claim 3, said feedback means including relay means for automatically uncoupling the reading head and tape punching means and returning said switch for automatic recycling in response to said wiper arm engaging a predetermined row of fixed contacts.

5. In a device as set forth in claim 4 including relay means responsive to being de-energized for returning said wiper arm to a predetermined start position from any other position of the wiper arm.

6. In a card to tape translator having card reading means, means for automatically feeding cards to the card reader means one at a time in response to a control signal, and tape punch means, a control circuit for operatively coupling said tape punch means and the card reading and feeding means comprising, a plural contact stepping switch, means responsive to said tape punch means for actuating said stepping switch whereby information from said card reading means is transferred to said tape punch means for punching said tape, relay means effecting automatic return of said stepper switch to a predetermined start position, and feedback means responsive to said tape punch means and providing a signal effecting automatic card feeding at a rate governed by the tape punch means.

7. A translator device for transferring information from cards to tape comprising, a card reader device, a tape punch device, a multiple contact stepping switch having a segment of contacts connecting with said card reader device, wiper arm means carried by said stepping switch, actuating means drivingly engaging said wiper arm and moving the same successively from one switch contact to another, relay means responsive to engagement of said wiper arm with a predetermined switch contact for actuation whereby said card reader is initially keyed to said tape punch device only at a predetermined start position, and cam means carried by said tape punch device and effecting movement of said wiper arm from one stepping switch contact to another as directed by the tape punch device only within the segment of stepping switch contacts coupling the card reader with said tape punch device.

8. A device as set forth in claim 7 including homing means for automatically cycling said stepping switch.

9. A punched card to punched tape translator comprising, a reading head having a plurality of circuits detecting punches in a card placed on the reading head, tape punching means, a switch having a plurality of rows of fixed contacts, the plurality of reading head circuits each connecting with a fixed contact in one group of fixed contacts on said switch, a wiper arm carried by said switch, said wiper arm having a plurality of movable contacts arranged to engage one row of fixed contacts at a time, actuating means operatively engaging said wiper arm and being responsive to a control signal for cyclically moving the wiper arm across the rows of fixed contacts, circuit means electrically coupling certain of the movable contacts with said tape punch means to produce punches in the tape corresponding to the punches in the card by scanning said one group of fixed contacts, first relay means completing a circuit making said tape punch machine initially operative only subsequent to a movable contact on said wiper arm engaging a predetermined fixed contact on the switch, timing means responsive to wiper arm movement within the limits of said one group of fixed contacts for completing a circuit keying the wiper arm to said tape punching means, and second relay means responsive to actuation for effecting return of the wiper arm to a predetermined start position independently of the operation of said tape punch machine.

10. A punched card to punched tape translator comprising, a reading head having a plurality of circuits detecting punches in a card placed on the reading head, tape punch means, a switch having a plurality of rows of fixed contacts, the plurality of reading head circuits each connecting with a fixed contact in one group of fixed contacts on said switch, a wiper arm carried by said switch, said wiper arm having a plurality of movable contacts all but one of which is arranged to engage only one row of fixed contacts at a time for electrically coupling the one group of fixed contacts to said tape punching means, the one movable contact on said wiper arm being arranged to bridge between contacts in two adjacent rows, actuating means operatively engaging said wiper arm and being responsive to a control signal for cyclically moving the wiper arm across the rows of fixed contacts, circuit means electrically coupling certain of the movable contacts with said tape punch means to produce punches in the tape corresponding to the punches in the card by scanning said one group of fixed contacts, first relay means completing a circuit making said tape punch machine initially operative only subsequent to a movable contact on said wiper arm engaging a predetermined fixed contact on the switch, and second relay means coupled to the bridging contact on said switch for holding the relay means energized to key wiper arm movement to said tape punching means only during wiper arm movement across the one group of fixed contacts.

11. A punched card to punched tape translator comprising, a reading head having a plurality of circuits detecting punches in a card placed on the reading head, tape punch means, a switch having a plurality of rows of fixed contacts, the plurality of reading head circuits each connecting with a fixed contact in one group of fixed contacts on said switch, a wiper arm carried by said switch, said wiper arm having a bridging contact arranged to engage two fixed contacts in adjacent rows at a time as well as a plurality of movable contacts each arranged to engage only one fixed contact at a time, and electrically couple the one group of fixed contacts to said tape punching means, actuating means operatively coupled to said wiper arm and effecting wiper arm movement across the plurality of rows of fixed contacts, homing relay means coupled to said bridging contact for returning said wiper arm to a predetermined start position, and switch means keying the movement of said wiper arm and tape punching means together only when moving across the one group of fixed contacts.

12. In a card to tape translator having card reading means, means for automatically feeding cards through the card reader means one at a time, and tape punch means, a control circuit for operatively coupling the tape punch means and the card reading and feeding means comprising, switch means, means responsive to the tape punch means for actuating said switch means whereby information from said card reading means is transferred to said tape punch means for punching said tape, relay means effecting automatic return of said switch means to a predetermined start position, and feedback means responsive to said tape punch means and providing a signal effecting automatic card feeding at a rate governed by the tape punch means.

13. A punched card to punched tape translator comprising, a reading head having a plurality of circuits detecting punches in a card placed on the reading head, tape punching means, switch means having a plurality of terminals electrically isolated from each other, the plurality of reading head circuits each connecting with a terminal in one group of the plurality of terminals on said switch means, said switch means including circuit means selectively coupling the plurality of terminals with said tape punching means by cyclically operating said switch means through a series of complete cycles to produce punches in the tape representing the punches in the card, first relay means making said switch means initially operative to couple the reading head with said tape punching means only in response to said switch means being returned to start a complete cycle, timing means responsive to said switch means for completing a circuit keying operation of the reading head and tape punching means during only a portion of each complete cycle, and second relay means responsive to said switch means for effecting return of said switch means for automatic re-cycling.

References Cited in the file of this patent

UNITED STATES PATENTS

| | | |
|---|---|---|
| 2,540,027 | Dodge | Jan. 30, 1951 |
| 2,600,938 | Thierfolder | June 17, 1952 |